May 24, 1932. E. W. GOESER Re. 18,480

ROTARY MACHINE

Original Filed July 7, 1925 4 Sheets-Sheet 1

INVENTOR:
EDWIN W. GOESER,
By Fred W. Lewis
ATTORNEY.

May 24, 1932. E. W. GOESER Re. 18,480

ROTARY MACHINE

Original Filed July 7, 1925 4 Sheets-Sheet 2

INVENTOR:
EDWIN W. GOESER,
By Fred A. Rauch
ATTORNEY.

May 24, 1932. E. W. GOESER Re. 18,480

ROTARY MACHINE

Original Filed July 7, 1925 4 Sheets-Sheet 3

INVENTOR:
EDWIN W. GOESER,
By Fab W Lewis
ATTORNEY.

May 24, 1932. E. W. GOESER Re. 18,480

ROTARY MACHINE

Original Filed July 7, 1925 4 Sheets-Sheet 4

INVENTOR:
EDWIN W. GOESER,
By Fred W. Kanz
ATTORNEY.

Reissued May 24, 1932

Re. 18,480

UNITED STATES PATENT OFFICE

EDWIN W. GOESER, OF LOS ANGELES, CALIFORNIA, ASSIGNOR, BY MESNE ASSIGNMENTS, OF ONE-HALF TO EMSCO DERRICK & EQUIPMENT COMPANY, OF LOS ANGELES, CALIFORNIA, A CORPORATION OF CALIFORNIA, AND ONE-HALF TO THE NATIONAL SUPPLY COMPANY, OF TOLEDO, OHIO, A CORPORATION OF OHIO

ROTARY MACHINE

Original No. 1,612,914, dated January 4, 1927, Serial No. 42,009, filed July 7, 1925. Application for reissue filed July 23, 1928. Serial No. 294,858.

My invention relates to rotary machines of the character employed in drilling oil wells by the so-called "rotary" system.

In the oil well drilling industry a rotary machine is placed on the floor of the derrick of a well. A drill pipe extends through a table of the rotary machine and carries a bit at its lower end. In the present common form of rotary machine the table has a bevel gear which is driven by a bevel pin in mounted on a pinion shaft which is rotatable in bearings of the rotary machine. A sprocket is secured to the pinion shaft, which sprocket is driven from a draw works of the derrick by means of a sprocket and chain arrangement. The rotary table rotates the drill pipe and the bit, the bit sinking the well.

A rotary machine is subjected to severe strains when in operation and it must therefore be very rugged so that such strains may be endured. These great strains tend to disalign the bearings and the pinion shaft, and to throw out of alignment and damage the associated parts of the machine.

It is an object of my invention to provide a rotary machine having pinion shaft bearings which cannot be thrown out of alignment with each other by strains placed upon the rotary machine during its operation.

Another object of my invention is to provide a rotary machine having a unitary bearing supporting member for supporting pinion shaft bearings.

A further object of my invention is to provide a rotary machine having novel means of supporting and securing the bearing supporting member of my invention in place.

An additional object of my invention is to provide a means for locking the pinion shaft of the rotary table from rotation.

Rotary machines are preferably each situated at the center of the derrick floor and the draw works are situated at one side of the derrick floor. The chain which drives the pinion shaft sprocket extends from the draw works across the derrick floor to the rotary machine, the chain generally having a guard to prevent a workman from being caught therein. It is highly desirable to have this chain close to the derrick floor so that workmen may step over it when crossing the floor and not have to walk around to the other side of the rotary machine.

It is a still further object of my invention to provide a rotary machine having a pinion shaft sprocket which is situated close to the floor of the derrick so that the chain by which it is driven may also be positioned very low.

Other objects and advantages of my invention will be made evident hereinafter.

Referring to the four sheets of drawings in which I illustrate my invention,

Figure 1:
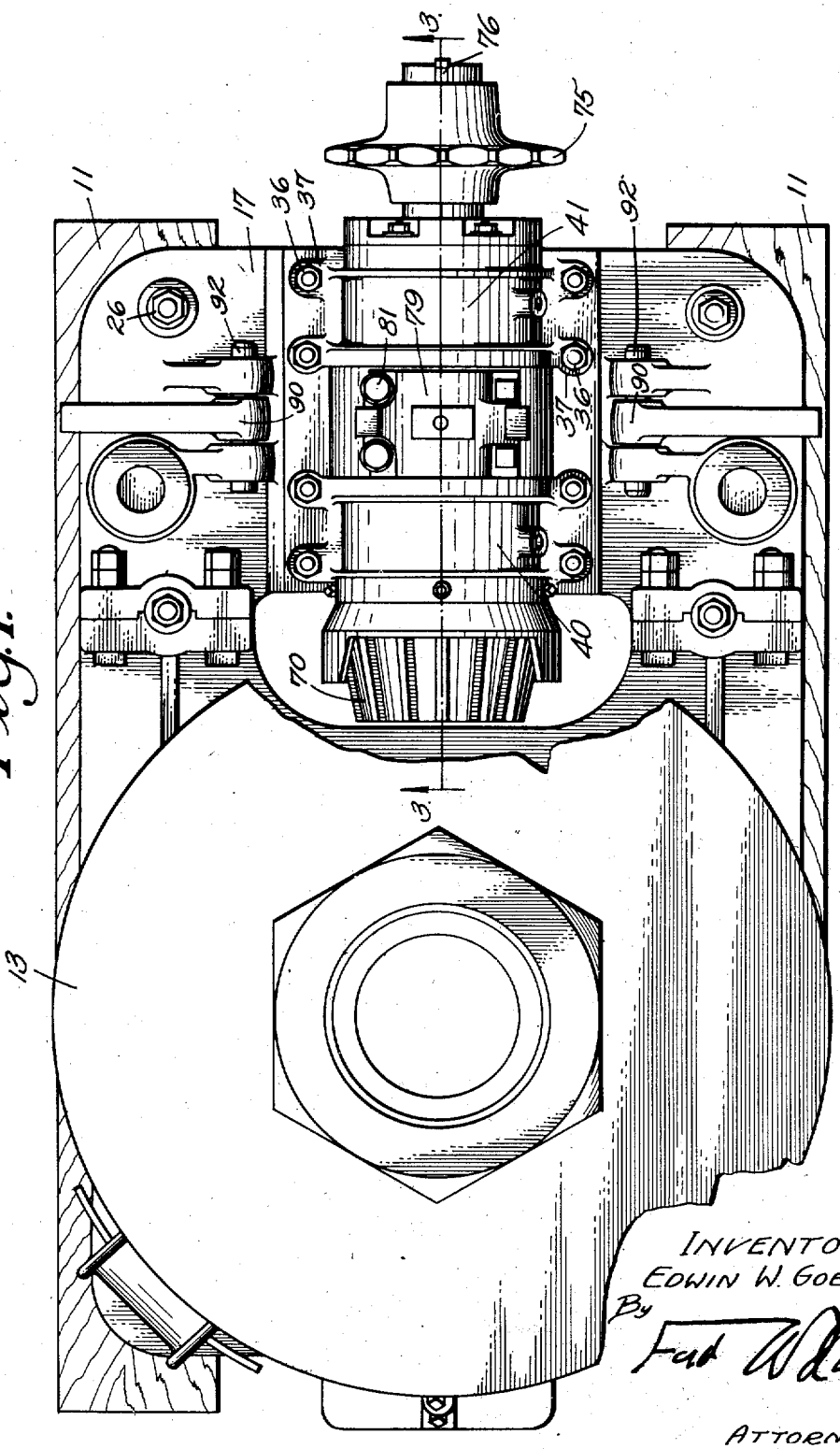
Fig. 1 is a plan view of a rotary machine embodying the features of my invention.
Figure 2:
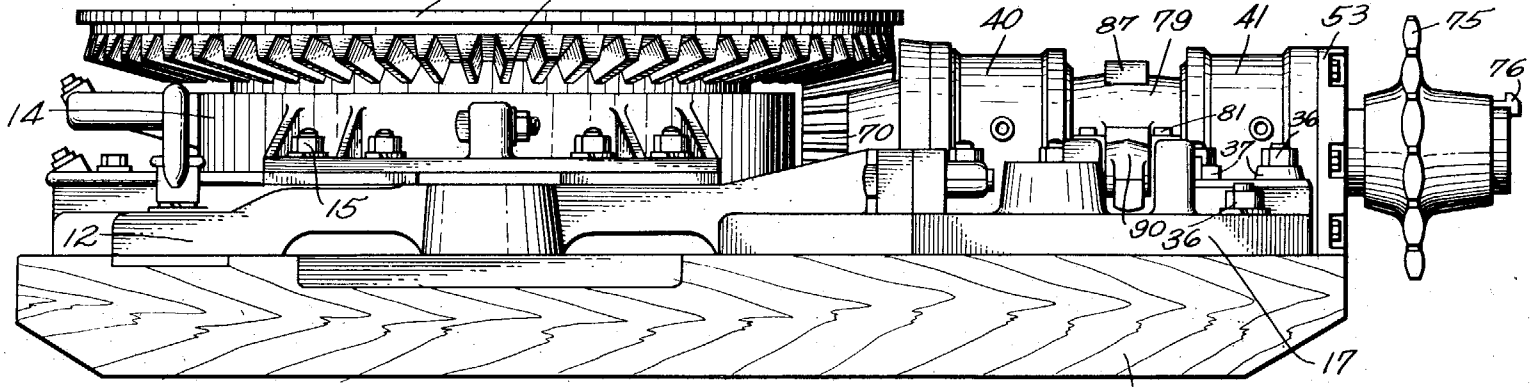
Fig. 2 is an elevational view of the rotary machine shown in Fig. 1.

With reference to Figs. 1 and 2 of the drawings the rotary machine of my invention has supporting timbers 11 on which a base 12 is secured. The base 12 supports a rotary table 13 which is free to turn in the base 12 and is held in place by a hold-down ring 14 secured to the base 12 by bolts 15. A block 17 is supported on the timbers 11 adjacent to the base 12. Faces 18 of flanges 19 of the block 17 rest on upper faces 20 of the timbers 11, and vertical faces 22 of lips 23 of the block 17 engage inner vertical faces 24 of the timbers 11. Bolts 26 extend through the timbers 11 and the flanges 19 for securing the block 17 rigidly in place. The flanges 19 of the block 17 are connected together by an arcuated wall 27 having flanges 28 extending downwardly therefrom from its opposite ends.

Figure 3:
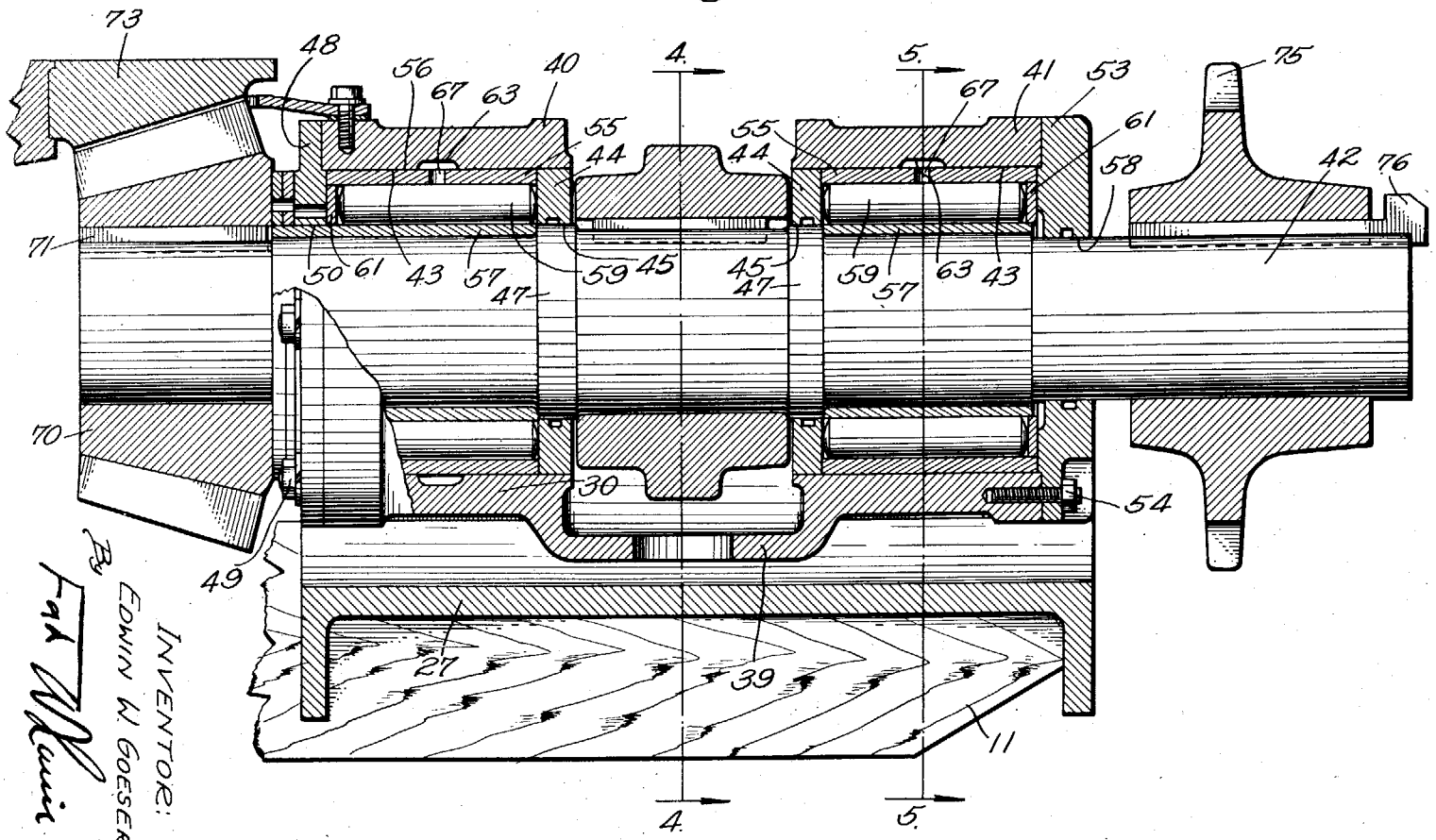
Fig. 3 is a fragmentary longitudinal section taken through the rotary machine as indicated by the line 3—3 of Fig. 1.

The block 17 supports a bearing supporting member 30. Horizontal faces 31 of oppositely arranged feet 32 of the bearing supporting member 30 rest on horizontal shoulders 33 provided by the block 17. Outer vertical faces 34 of the feet 32 engage vertical confining walls 35 of the block 17. Bolts 36 pass through the block 17 and through the feet 32 for securing the bearing member 30 in place, there being bosses 37 formed on the upper faces of the feet 32 through which the bolts 36 extend. With reference to Fig. 3, at the inner end of the bearing member 30 is an inner bearing housing 40 and at the outer end of the bearing member 30 is an outer bearing housing 41. A curved web 39 extends between the bearing housings 40 and 41.

A pinion shaft 42 extends through the bearing housings 40 and 41. The bearing housings have internal cylindrical faces 43. End rings 44 are forced into the adjacent ends of the cylindrical faces 43 of the bearing members 40 and 41 for the purpose of providing closures therefor. The end rings 44 have cylindrical openings 45, inside of which cylindrical enlargements 47 of the pinion shaft 42 rest. The inner end of the inner bearing housing 40 is closed by an inner plate 48 which is secured thereto by bolts 49. The inner plate 48 has a cylindrical opening 50 through which the pinion shaft 42 extends. The outer bearing housing 41 has its outer end closed by an outer plate 53 which is secured in place by bolts 54. The outer plate 53 has a cylindrical opening 58 through which the pinion shaft 42 extends.

Figure 5:
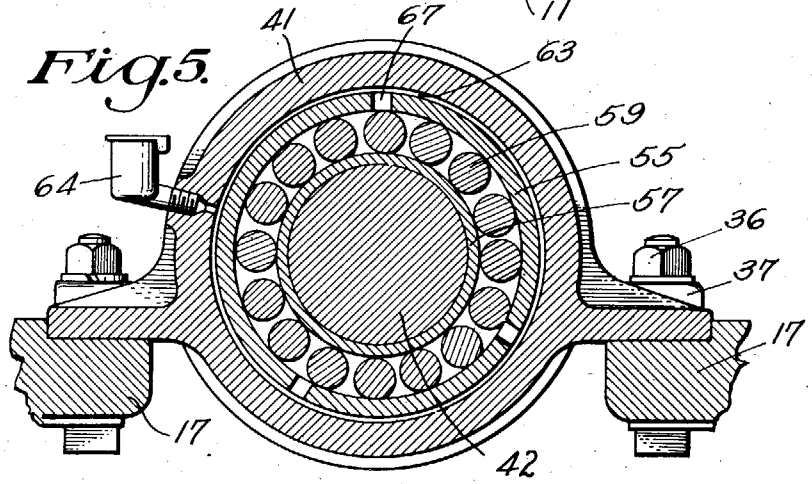
Fig. 5 is a fragmentary cross section taken on the line 5—5 of Fig. 3.

Placed in the inner and outer bearing housings 40 and 41 between the end rings 44 and the plates 48 and 53 are bearing sleeves 55 which have outer faces 56 adapted to engage the internal cylindrical faces 43 of these bearing housings. The portions of the pinion shaft 42 resting inside the housings 40 and 41 have journal sleeves 57 placed thereupon. Between the journal sleeves 57 and the bearing sleeves 55, roller bearings 59 are placed, as clearly shown in Figs. 3 and 5. Annular plates 61 are placed in the housings 40 and 41 between the journal and bearing sleeves 57 and 55 adjacent to the inner and outer plates 48 and 53. The annular plates 61 are provided to restrain the roller bearings 59 from axial movement.

Annular oil channels 63 are formed in the internal cylindrical faces 43 of the bearing housings 40 and 41. Lubricating oil is supplied to these oil channels by oil cups 64 which are connected to these channels 63 through the housings 40 and 41, as indicated at 65 in Fig. 5. The oil passes from the oil channel 63 to the roller bearings 59 through openings 67 formed in the bearing sleeves 55.

A pinion 70 is rigidly secured at the inner end of the pinion shaft 42 by a key 71. The pinion 70 engages a bevel gear 73 of the rotary table 13, the rotary table being driven by the pinion 70. At the outer end of the shaft 42 there is placed a pinion shaft sprocket 75 which is rigidly secured in place by a key 76. The pinion sprocket 75 is adapted to receive a sprocket chain (not shown) by means of which the pinion shaft 42 is rotatably driven.

Figure 4:
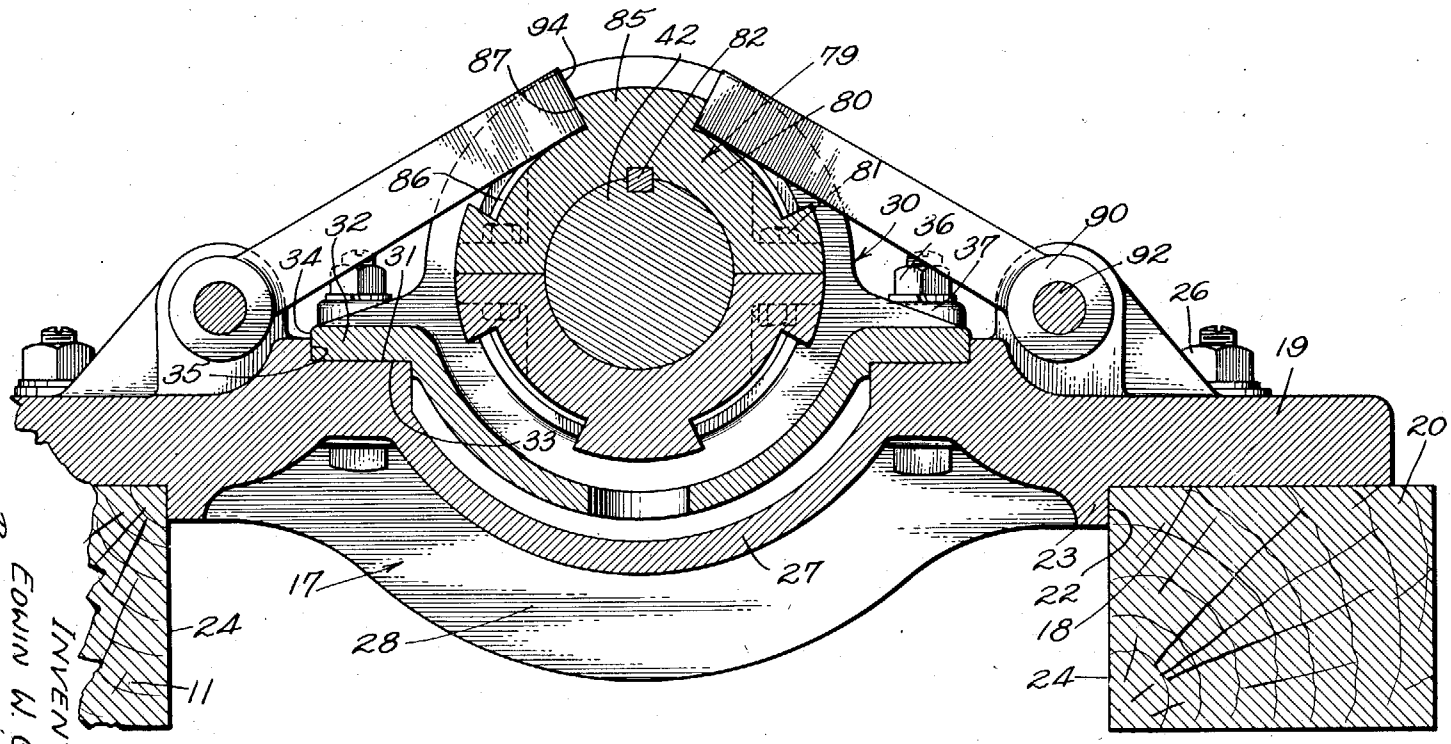
Fig. 4 is a cross section taken on the line 4—4 of Fig. 3.

As clearly shown in Figs. 3 and 4, there is a space 77 provided between the inner and outer bearing housings 40 and 41. A split collar 79 is secured upon the shaft 42 in this space 77. As shown clearly in Fig. 4, the split collar 79 is composed of halves 80 which are secured together by bolts 81. A key 82 renders the collar 79 non-rotatable on the shaft 42. The collar 79 is provided with lugs or projections 85 which are separated by grooves 86 and which have opposing shoulders 87. Dogs 90 are pivoted between lugs 91 of the block 17 on shafts 92 supported by these lugs 91. The dogs 90, as clearly shown in Fig. 4, are swingable in a plane at right angles to the axis of rotation of the shaft 42 and may be swung into such a position that end faces 94 thereof engage opposite shoulders 87 of a projection 85.

By reason of such an engagement the shaft 42 is positively locked against rotation. When the rotary table is in operation, the dogs 90 are swung outwardly from engagement with the collar 79.

In the operation of the rotary table the pinion sprocket 75 is driven by a sprocket chain which extends from the draw works of the derrick. As previously mentioned, the pinion shaft sprocket 75 rotates the pinion shaft 42, which in turn revolves the pinion 70. The pinion 70 by reason of its engagement with the bevel gear 73 of the table 13 rotates the table. As previously mentioned, the rotary machine is generally situated at the center of the floor of the derrick, whereas the draw works is generally situated to one side of the floor of the derrick. Consequently, the sprocket chain must extend across the floor of the derrick. It is very desirable to have the sprocket chain quite close to the floor so that workmen may step over the chain, thus saving considerable time by not having to walk around the rotary machine to get to the opposite side of the derrick. One feature of my invention is to provide a rotary machine having a pinion shaft sprocket which is situated close to the derrick floor. As clearly shown in the drawings, the pinion shaft sprocket 75 is placed on the extending end of the shaft 42. The chain passing over the sprocket 75 is extended to one side of the bearing and the timbers of the rotary machine, and for this reason the pinion shaft 42 can be quite low as it is not necessary to avoid any of the parts of the rotary machine.

In the common construction of rotary machines, the pinion shaft sprocket is usually placed between the bearings of the pinion shaft. The pinion shaft must be fairly high so that a chain may pass around the sprocket without interfering with or engaging any parts of the rotary machine. Another advantage of my construction resides in the fact that the complete rotary machine will be very rigid because of a very low center of gravity.

The locking means of my invention is very desirable as it is necessary to lock the pinion shaft 42 from rotation during certain periods in the use of the rotary machine.

The construction of my invention is quite simple and it is easy to install and simple to operate. The block 17 is accurately aligned by the engagement of the faces 18 and 22 of this block with the faces 20 and 24 of the timbers 11. The bearing supporting member 30 is also accurately aligned by engagement of the faces 31 and 34 of the bearing member with the faces 33 and 35 of the block 17.

There will positively be no disalignment between the bearings of my invention due to any strains placed thereupon during the operation of the rotary machine. This is very important as such a disalignment would damage some parts of the rotary machine and cause others to quickly wear away. I accomplish this important consideration of my invention by providing a unitary bearing supporting member for supporting the bearings of my invention.

The bearing member 30 is ruggedly designed and is formed so that the bearings and other parts may be cheaply assembled together without sacrificing any ruggedness which is very essential to the rotary machine.

I claim as my invention:

1. In a rotary well drilling apparatus, the combination of: a base; a rotary table vertically journaled on said base; a horizontally disposed self-contained pinion-shaft unit aligned radially with the axis of said table, said unit comprising a unitary bearing support engaging in opposed parallel ways in said base and having two relatively spaced bearing housings, bearings in said housings, a pinion-shaft journaled in said bearings, and a pinion secured on the inner end of said shaft and in driving connection with said table; and means for detachably securing said unit in position in said ways.

2. In a rotary well drilling apparatus, the combination of: a base; a rotary table vertically journaled on said base; a horizontally disposed self-contained pinion-shaft unit aligned radially with the axis of said table, said unit comprising a unitary bearing support engaging in opposed parallel ways in said base and having two relatively spaced bearing housings, bearings in said housings, a pinion-shaft journaled in said bearings, and a pinion secured on the inner end of said shaft and in driving connection with said table; means for detachably securing said unit in position in said ways; and means for locking the pinion-shaft against rotation.

3. In a rotary well drilling apparatus, the combination of: a base; a rotary table vertically journaled on said base; a horizontally disposed self-contained pinion-shaft unit aligned radially with the axis of said table, said unit comprising a unitary bearing support engaging in opposed parallel ways in said base and having two relatively spaced bearing housings, bearings in said housings, a pinion-shaft journaled in said bearings, abutment means secured to said shaft between said bearings, and a pinion secured on the inner end of said shaft and in driving connection with said table; means for detachably securing said unit in position in said ways; and means on said base adapted for engagement with said abutment means for retaining said shaft against rotation.

4. In a rotary well drilling apparatus, the combination of: a base; a rotary table vertically journaled on said base; a horizontally disposed self-contained pinion-shaft unit aligned radially with the axis of said table, said unit comprising a unitary bearing support engaging in opposed parallel ways in said base and having two relatively spaced bearing housings, bearings in said housings, a pinion-shaft journaled in said bearings, and a pinion secured on the inner end of said shaft and in driving connection with said table; means for detachably securing said unit in position in said ways; and a driving means secured to the outer free end of said shaft.

5. In a rotary well drilling apparatus, the combination of: a base; a rotary table vertically journaled on said base; a horizontally disposed self-contained pinion shaft unit aligned radially with the axis of said table, said unit comprising a unitary bearing support engaging in opposed parallel ways in said base and having two relatively spaced bearings supported therein on a common axis; a pinion shaft journaled in said bearings, abutment means secured to said shaft between said bearings, and a pinion secured on the inner end of said shaft and in driving connection with said table; means for detachably securing said unit in position in said ways; and means on said base adapted for engagement with said abutment means for retaining said shaft against rotation.

6. In a rotary machine, the combination of: a base; a table rotatably supported by said base; a unitary housing adapted to be secured to said base, said unitary housing having a pair of separated bearing housings; a pair of relatively spaced bearings, one being carried in each of said bearing housings, said bearings being rigidly retained in such relative positions as to be on the same axis; a shaft journaled in said bearings; aligning means cooperating between said base and said unitary housing for maintaining said unitary housing in such a position that the axis of said bearings will intersect the axis on which said table rotates; abutment means secured to said shaft between said bearing housings; and engagement means carried by said base and being engageable with said abutment means.

7. In a rotary machine, the combination of: a base; a table rotatably supported by said base; a unitary housing adapted to be secured to said base, said unitary housing having a pair of separated bearing housings; a pair of relatively spaced bearings, one being carried in each of said bearing housings, said bearings being rigidly retained in such relative positions as to be on the same axis; a shaft journaled in said bearings; aligning means cooperating between said base and said unitary housing for maintaining said unitary housing in such a position that the axis of said bearings will intersect the axis on which said table rotates; lock means secured to said shaft between said bearing housings; and engagement means carried by said base and being engageable with said lock means.

8. In a rotary well drilling apparatus, the combination of: a base; a rotary table vertically journaled on said base; a horizontally disposed self-contained pinion shaft unit aligned radially with the axis of said table, said unit comprising a unitary bearing support engaging in opposite parallel ways in said base and having two relatively spaced bearing housings, two relatively spaced bearings, one being supported in each of said bearing housings and on a common axis, a pinion shaft journaled in said bearings, and a pinion secured to the inner end of said shaft and in driving connection with said table; and means for detachably securing said unit in position in said ways.

9. In a rotary well drilling apparatus, the combination of: a base; a rotary table vertically journaled on said base; a horizontally disposed self-contained pinion shaft unit aligned radially with the axis of said table, said unit comprising a unitary bearing support engaging in opposite parallel ways in said base and having two relatively spaced and separated bearing housings, bearings supported in each of said housings, said bearings being on a common axis, a pinion shaft journaled in said bearings, and a pinion secured to the inner end of said shaft and in driving connection with said table; means for detachably securing said unit in position in said ways; and a driving means supported on the outer free end of said shaft.

In testimony whereof I have hereunto set my hand at Los Angeles, Los Angeles County, California, this 28th day of June, 1928.

EDWIN W. GOESER.